United States Patent [19]

Deibig et al.

[11] Patent Number: 5,378,751
[45] Date of Patent: Jan. 3, 1995

[54] COOH GROUP-CONTAINING POLYMER, MIXTURE OF COOH GROUP-CONTAINING POLYMERS AND FILLERS AND THE USE FOR THE PRODUCTION OF MOULDED ARTICLES

[75] Inventors: Heinrich Deibig, Guensberg; Albrecht Dinkelaker, Biberist, both of Switzerland

[73] Assignee: Belland AG, Solothurn, Switzerland

[21] Appl. No.: 220,735

[22] Filed: Mar. 31, 1994

Related U.S. Application Data

[60] Division of Ser. No. 7,804, Jan. 22, 1993, Pat. No. 5,322,878, which is a continuation of Ser. No. 593,491, Oct. 3, 1990, abandoned, which is a division of Ser. No. 262,621, Oct. 26, 1988, abandoned.

[30] Foreign Application Priority Data

Oct. 28, 1987 [DE] Germany .............................. 3736575
Oct. 14, 1988 [DE] Germany .............................. 3825013

[51] Int. Cl.$^6$ ................................................ C08K 3/32
[52] U.S. Cl. ..................................... 524/414; 524/428; 524/439; 524/423; 524/447; 524/449; 524/451; 524/560

[58] Field of Search ............... 524/414, 423, 447, 449, 524/451, 428, 439, 560

[56] References Cited

U.S. PATENT DOCUMENTS

| | | | |
|---|---|---|---|
| 2,772,251 | 11/1956 | Hansen et al. | 526/318.4 |
| 3,258,454 | 6/1966 | Vona et al. | 525/318.4 |
| 3,862,096 | 1/1975 | Kitamura et al. | 525/318.4 |

FOREIGN PATENT DOCUMENTS 46-42024   11/1971   Japan .............................. 526/318.4

*Primary Examiner*—Ralph H. Dean
*Assistant Examiner*—Mark D. Sweet
*Attorney, Agent, or Firm*—Lackenbach Siegel Marzullo Aronson & Greenspan

[57] ABSTRACT

The invention relates to thermoplastically shapeable mixtures of COOH group-containing polymers dissolvable in an aqueous neutral or aqueous-alkaline medium with fillers. Such mixtures can be processed by thermoplastic shaping to moulded articles, which are dissolvable after use. The invention also relates to suitable copolymers for this purpose and the use thereof for the production of moulded articles.

16 Claims, No Drawings

COOH GROUP-CONTAINING POLYMER, MIXTURE OF COOH GROUP-CONTAINING POLYMERS AND FILLERS AND THE USE FOR THE PRODUCTION OF MOULDED ARTICLES

This application is a division of application Ser. No. 08/007,804 filed Jan. 22, 1993, now U.S. Pat. No. 5,322,878, which is a continuation of application Ser. No. 07/593,491 filed Oct. 3, 1990, now abandoned, which is a division of application Ser. No. 07/262,621 filed Oct. 26, 1988, now abandoned.

The invention relates to a COOH group-containing thermoplastic copolymer, a thermoplastically shapeable mixture of a COOH group-containing polymer soluble in an aqueous and in particular aqueous-alkaline medium and fillers, as well as the use of the copolymer and the mixture for producing moulded articles. COOH group-containing polymers, particularly copolymers, produced using COOH group-containing unsaturated, organic carboxylic acids and copolymerizable unsaturated compounds have already been described. Reference is e.g. made to European Patent 32 244 and EP-OS 69 296, 143 894 and 143 935, to whose content reference is made here. These publications already disclose that from COOH group-containing polymers it is possible to produce moulded articles, particularly sheets or films, which are soluble in an aqueous-alkaline medium. It is possible to rapidly dissolve thin moulded articles, such as sheets, whereas thicker moulded articles, such as e.g. injection mouldings, require larger alkaline-acting medium quantities and the time for the complete dissolving thereof is considerable.

It has now been found that COOH group-containing polymers soluble or disintegratable in an aqueous medium and in particular mixed with fillers are suitable for the production of adequately stable moulded articles, the latter having the advantage that they can be adequately rapidly dissolved, whilst saving alkali.

The object of the invention is a copolymer of 0.2 to less than 2.5 mole of (meth)acrylate per mole of (meth)acrylic acid and 0 to 0.5 mole of a neutral termonomer, which differs from (meth)acrylate. Preferably the copolymer is of 0.2 to 2 mole and in particular 0.4 to 0.8 mole of (meth)acrylate per mole of (meth)acrylic acid. The molar ratio of 0.5 to 1 is particularly preferred. It has been found that copolymers with such a high proportion of carboxylic acid or carboxyl groups can still be thermoplastically processed. As a result of their high carboxyl group proportion the copolymers can be dissolved in aqueous media on only adding small amounts of basic substances. Particularly if the molar proportion of (meth)acrylic acid is higher than the molar proportion of (meth)acrylate, the polymer can be disintegrated in neutral aqueous media and is in particular at least partly soluble in neutral aqueous media. Disintegratable is understood to mean a decomposition and at the most a small part of the copolymer is dissolved. The remainder is in particle form and in particular as a suspension. This makes it possible to disintegrate or dissolve the copolymers and articles produced therefrom in aqueous media without adding alkalis or through only adding small amounts of alkalis and the copolymer can be reprecipitated by slight acidification of the aqueous medium, so that as a result of the small amount of acid or alkali, it is possible to avoid an undesirably high salt formation during neutralization processes. The carboxyl content of the copolymer is preferably 30 to 50 and in particular 35 to 45% by weight, approximately 40% by weight, based on the filler-free polymer being particularly preferred.

The acrylate of the copolymer is preferably methyl acrylate and the acid is preferably acrylic acid. The copolymer is preferably free from termonomers. If termonomers are present, then preference is given to acrylates or methacrylates, in which the alcohol radical has 2 to 18 and in particular 2 to 6 C-atoms.

The copolymer can be in the form of a thermoplastically processable powder or granular material, as well as an injection moulding, compression moulding, pressed article, blow moulding, deep-drawn part, moulding or in the form of a sheet, plate or some other moulded article, in each case optionally in conjunction with water-soluble and/or water-insoluble fillers.

The invention also relates to a thermoplastically shapeable mixture of 10 to 90% by weight of at least one COOH group-containing polymer soluble in an aqueous-alkaline medium and 90 to 10% by weight of at least one filler. At least 10% by weight of the filler, based on the total weight of the mixture, can be soluble in neutral or alkaline-aqueous medium. The soluble filler is preferably neutral. The filler can advantageously also be insoluble in aqueous media, particularly neutral and acid aqueous media. A suitable filler is in particular talc, as well as barium sulphate, calcium phosphate, mica, kaolin, etc. Mixtures are also possible.

It has been found that the filler proportion can be very high, without any deterioration to the thermoplastic processability of the mixture and the strength of the moulded article. Thus, it is possible to work with filler quantities in the range 30 to 80 and particular 30 to 70% by weight. For many applications, mixtures with a filler proportion of 40 to 60 and in particular approximately 50% by weight are suitable. The particle size of the fillers preferably in the range 0.1 to 2 mm, particularly 0.2 to 1 mm. However, it can also be much lower that this. Thus, in the case of insoluble fillers, it is preferably in the range 0.1 to 200 μm, particularly 0.2 to 5 0 μm.

If insoluble fillers are used, then the filler content is preferably lower and is in particular 10 to 7 0% by weight. In conjunction with insoluble fillers preference is given to the use of copolymers, in which the molar proportion of (meth)acrylate to (meth)acrylic acid is at the most 1:1 and is preferably below this and is in particular approximately 0.5:1. The better water solubility of the copolymers then aids the dissolvability without any need for alkali or with only small alkali quantities. The disintegratability is also aided by higher filler quantities.

The mixture is preferably in the form of a granular material or powder, in which the polymer and the filler are already firmly interconnected and preferably in the form of an intimate mixture. Such A state of the mixture facilitates processability and leads to moulded articles with uniform characteristics. The intimate mixing between the filler and copolymer can take place with the aid of an extruder. Preferably the polymer is produced by polymerization in the extruder, as is described in EP-OS 143 894. Following processing, the mixture is preferably in the form of a moulded article. The moulded articles are preferably produced by processing and/or forming, such as moulding, injection moulding, compression injection moulding, rotational moulding, blow moulding, deep drawing and/or cavity injection (gas internal pressure process), as is conventional when processing thermoplastics. Other processing processes can also be used. It has been found that such mouldings have a very good stability. Thus, they can have a modulus of elasticity of over 2000 and even over 20000 N/mm². Breaking elongations of less than 20%, particularly less than 10% are attainable. As a function of the nature of the polymer used, particularly in the case of a high filler proportion, due to the poor thermal, conductivity on injecting round external thermal loads of over 300° C. and in individual cases up to 420° C. are possible.

The COOH group-containing polymers, the mixtures according to the invention and the moulded articles produced therefrom have the important advantage that the polymer proportion following dissolving in neutral, aqueous or alkaline-aqueous media can be recovered by subsequent precipitation with acid and as a result insoluble fillers can easily be separated from the dissolved polymer. It is even possible to recover water-soluble fillers and further reference will be made to this hereinafter.

The filler can be entirely constituted by water-soluble, particularly neutral fractions and this is preferred in many cases. However, it is also possible to use insoluble and in particular mineral fillers alone, or mixed with water-soluble fillers. In one embodiment at least 50% by weight of the filler is water-soluble. Suitable water-soluble fillers are in particular inorganic, water-soluble salts, particularly alkali nitrates and/or alkali sulphates as a result of their thermal stability. However, particularly when importance is not attached to the thermal stability, it is possible to use water-soluble, organic fillers. As has already been stated neutral reacting fillers are particularly preferred. The solutions of the water-soluble fillers obtained after precipitating the polymer with acid can be directly further used. In this way the nitrate-containing solutions have fertilizer characteristics. In the case of sulphate-containing solutions it is possible to recover the sulphate following acidification with sulphuric acid by precipitating with milk of lime and accompanied by the obtaining of gypsum, whilst simultaneously reusable alkali is obtained. Thus, it is possible to process the solutions obtained during the dissolving of the moulded articles in a manner not prejudicial to the environment. The COOH group-containing polymers can also be treated with ammonia, particularly NH₃ gas, preferably under pressure at 0° to 100° C., in order to make the material water-soluble. A neutral aqueous medium is then adequate for dissolving purposes. In this case ammonium carbonate can also be used as the salt. Preferably the copolymers are not completely dissolved and are instead only disintegrated. Moulded articles produced from the copolymers or the mixtures with fillers decompose in aqueous suspensions, which contain undissolved copolymer in finely divided form in suspension. As a function of whether or not the fillers are soluble, they are either in the solution phase or, together with the copolymer, in the dispersed phase. Due to the fact that the greatest part of the copolymer is not dissolved by the aqueous medium, but is merely divided into particles, it is possible with work without or with only small alkali quantities.

Preferred polymers are copolymers of 0.2 to 4 mole of (mth)acrylate per mole of (meth)acrylic acid and 0 to 0.5 mole of a neutral termonomer, which differs from the (meth)acrylate. Acrylic acid is the preferred acid. The (meth)acrylate is preferably one having an alcohol radical with 1 to 6 C-atoms. Acrylates are preferred and once again methyl acrylate is particularly preferred. A particularly favorable mixing ratio of the monomer is 0.5 to 2 mole of (meth)acrylate per mole of (meth)acrylic acid and in the case of a molar ratio of 1:1 very good thermoplastic characteristics are combined with good solubility. If the acid proportion is increased, then the solubility is also increased, whilst conversely by increasing the acrylate proportion the thermoplastic characteristics are improved. The solubility and thermoplastic characteristics can also be influenced by a suitable choice of termonomer. The termonomers can be constituted by monomers of aromatic vinyl hydrocarbons carbons with 8 to 11 C-atoms, particularly styrene, acrylate or methacrylate with an alcohol radical having 1 to 18 C-atoms and in particular n-butylacrylate, butyl methacrylate and stearyl methacrylate. It is also possible to use termonomers with polar groups, such as hydroxyl groups, etc., if it is desired to make the copolymer very soluble, whilst attaching less importance to the resistance to water. In many cases it is preferable to use no termonomers.

It has hitherto been assumed that copolymers of (meth)acrylate and (meth) acrylic acid with a high acid proportion could not be produced in thermoplastic form. It has now been found that particularly during polymerization in the extruder, as described in EP-OS 143 894 and EP-OS 143 935, it is also possible to produce copolymers with less than 2.5 mole of (meth)acrylate per mole of (meth)acrylic acid and that such copolymers are also suitable for the processing of moulded articles. The copolymers forming the subject matter of the invention can also be produced using termonomers, as described hereinbefore. Preference is given to a molar ratio of (meth)acrylate to (meth)acrylic acid of 0.5 to 2:1, particularly 0.5 to 1:1. The good thermoplastic processability is probably due to a unitary molecular weight. The molecular weight of the polymers according to the invention is preferably in the range 10,000 to 100,000, particularly 40,000 to 60,000. It is possible to achieve a ratio of MW (weight average molecular weight) to MN (number average molecular weight) of 3 to 4 and below and this is preferred. Here again, copolymers of acrylic acid and methylacrylate are particularly preferred.

The previously described inventive copolymers are suitable as such for the production of many moulded articles and also for the preparation of the previously described mixture with fillers and can be in the form of powders, granular materials, injection mouldings, pressed articles, compression mouldings, blow mouldings, deep drawn parts, mouldings and, in the case of a soft setting, also sheets, plates, filaments, etc. In general terms, the presently described copolymers and in particular those with less than 2.5 mole of (meth)acrylate per mole of (meth) acrylic acid are suitable for the production of mould cores disintegratable or dissolvable in an aqueous medium, particularly in an alkaline medium. As described in general terms hereinbefore for the moulded articles, the mould cores can be produced by processing and/or forming, such as moulding, injection moulding, compression injection moulding, rotational moulding, blow moulding, deep drawing and/or cavity injection (gas internal pressure process) and the like. For the production of moulded articles the copolymers or their mixtures with fillers can contain other additives, which are conventionally used in the shaping of thermoplastic materials, such as stabilizers, lubricants, mould parting agents, etc.

Further features and advantages of the invention can be gathered from the following description of preferred embodiments in conjunction with the claims. The individual features can be realized in the individual embodiments either singly or in the form of combinations.

In the following examples the copolymers were produced in accordance with the procedure described in EP-OS 143 894 and 143 935 by copolymerization in the extruder, the copolymer preferably being introduced without intermediate granulation from the first extruder in the form of a melt directly into a second extruder (cascade system), where venting takes place and residual monomers are removed. This is followed by optional mixing with fillers in the second extruder. Venting can at least partly take place prior to the introduction into the second extruder. The polymers or mixtures obtained are discharged in strand-like manner from the second extruder and are granulated.

EXAMPLE 1

A copolymer of 2 mole of methylacrylate per mole of acrylic acid was mixed in the second extruder and following venting in a weight ratio of 1:1 with pulverulent, previously dried sodium sulphate. A uniform, milky-cloudy melt was obtained, which was discharged from the second extruder in the form of strands having a diameter of approximately 3mm and these were cut to size in lengths of approximately 4mm. The granular materials containing the mixture of copolymer and water-soluble, neutral filler were processable to mouldings in the conventional manner in injection machines. The moulding of copolymer and sodium sulphate used as the core, following the cooling of the plastic part injected around it could be dissolved out through an opening thereof with the aid of a hot soda solution within a few minutes.

EXAMPLE 2

In much the same way as described in Example 1, mixtures of a polymer, but prepared with a molar ratio of methylacrylate to acrylic acid of 1:1, and sodium sulphate or sodium nitrate with varying quantity ratios were used. With increasing salt content the moulded articles produced from the mixtures were lighter and more rapidly soluble in aqueous-alkaline media. The moulded articles had a modulus of elasticity of 8000 $N/mm^2$, an elongation at break of less than 10% and a temperature resistance of 70° C. As a result of the low thermal conductivity thereof, it was possible to use same as mould cores and to inject round them plastic melts with a higher temperature of e.g. 280° C., without any change to the shape thereof.

EXAMPLE 3

A copolymer of 0.75 mole of methylacrylate per mole of acrylic acid was prepared in the manner described hereinbefore. Moulded articles produced by thermoplastic processing from the copolymer were rapidly dissolvable and could also be mixed with fillers and processed.

In a similar manner mixtures were prepared which, apart from or instead of the water-soluble fillers, contained water-insoluble fillers.

EXAMPLE 4

A copolymer of 0.5 mole of methylacrylate per mole of acrylic acid was produced in the extruder. Into the copolymer melt were incorporated in the extruder 25% by weight of talc, which serves as a water-insoluble filler and as a lubricant. Further conventional additives, such as antioxidants and additional lubricants, such as zinc stearate can be incorporated in the usual way. The mixture obtained can be directly further processed, e.g. shaped into a moulded article or converted into a granular material.

With the aid of a cavity injection machine the mixture obtained was injected into a die in such a quantity for the production of mould cores having cavities that same was partly filled with the melt. By blowing nitrogen into the melt, the latter was expanded and pressed against the inner wall of the die for forming the die core and then cooled. Appendages can be provided in the die for creating openings in the mould core and these facilitate the subsequent penetration of the aqueous medium used for dissolving purposes into the mould core.

After injecting round the mould core with a thermoplastic material and cooling the plastic, the composite article constituted by the plastic and the mould core was introduced into hot neutral water and refluxed. The water could penetrate into the mould core through openings in the latter and destroy it from the interior. The mould core disintegrated, but only a small part of the polymer dissolved. Most of the copolymer was obtained in the form of a suspension together with the insoluble filter and this was washed out of the plastic article.

On cooling the solids content of the suspension rose. By acidifying the aqueous suspension with a small amount of sulphuric acid, the suspension was subdivided into two phases, namely a thick slime with approximately 40 to 45% by weight solids content and an aqueous polymer solution with approximately 4 to 5% by weight solids content, which floats. The aqueous polymer solution was separated by filtering over a filter bag and then the sulphuric acid contained in the filtrate was neutralized by adding barium hydroxide and converting into insoluble barium sulphate. The filtrate can then again be used for "dissolving" or disintegrating further moulded articles or mould cores. By concentrating or working with relatively small water quantities compared with the mould core weight, it is also possible to work without acidification, i.e. completely free from additions of acids and bases and also completely free from salt.

The thick slime containing the solid copolymer and the talc is then dried. The solid fractions are obtained with a yield of 95% by weight as powder. The powder can be melted and optionally after supplementing copolymer and/or talc, can again be used for producing mould cores. Through the reusability of both the solids and also the neutralized filtrate solution, no prejudicial waste materials are obtained. A salinization of waste waters and sewage is prevented. In place of sulphuric acid and barium hydroxide, it is possible to use other acid-base pairs, which form insoluble salts, e.g. calcium phosphate. The insoluble salts are usable as fillers.

The polymers according to the invention can absorb water. Thus, prior to processing, it is advantageous to carry out predrying at temperatures of 70° to 100° C., preferably 90° to 95° C., preferably in the dry air oven or vacuum cabinet, e.g. to a moisture content below 0.2%, preferably below 0.05%. However, working is, also possible without predrying.

In order to avoid moisture absorption in the case of the moulded articles, particularly the finished cores, immediately following the production of the cores and after joining together the core halves, preference can be given to storage in a drying room or a sealing of the cores, if the latter are not to undergo immediate further processing.

Cores produced by moulding, injection moulding, compression injection moulding and deep drawing generally comprise two shells, which can be interconnected prior to covering. Adhesion and welding are suitable as joining methods.

The usable adhesives are water, a dissolving core polymer disintegrated in water or some other polymer which is disintegratable or soluble in water with and without fillers, reinforcing substances and additives, in a normal or concentrated form; an organic solvent; a dissolving core polymer dissolved in the organic solvent or some other water-disintegratable or water-soluble polymer with or without fillers, reinforcing substances and additives; dispersions of the dissolving core polymer, or some other water-disintegratable or water-soluble polymer.

The welding methods which can be used are ultrasonic, vibration, rotational, hotplate, electromagnetic and other welding methods.

The core enveloping or covering materials generally have a processing temperature higher than the thermal stability of the dissolving core material. To prevent softening of the core, in the case of preferred hollow cores, the core cavity can be used as a cooling duct during enveloping.

The cooling medium can be constituted by all gases or liquids, provided that in spite of the action thereof the core fulfills its function during enveloping. As the dissolving process is time-dependent, even water can be used as the cooling medium. The cooling medium can also be constituted by cooled or liquefied air or nitrogen.

Prior to enveloping, the core can also be thermostatically controlled in a cooled room. As a result the thermal capacity of the core is increased up to its softening point. However, as a rule, there is no need for cooling.

On dissolving hollow cores, water flows through the core, the flow preferably being turbulent, so that use can be made of the abrasive forces of the water (optionally alkaline water).

The preferred solution is the introduction of probes into the hollow core. These probes have holes, out of which pass water jets and strike the core surface. The probes can perform axial and rotational movements, so that the abrasive action of the water jets discharged under high pressure acts on the entire core inner surface.

The probes can be made from metal or hot water-resistant plastic. It is also possible to use limitedly hot water-resistant plastic probes, which can be replaced after being used once or several times. The plastic probes can be stiff or flexible, as a function of the plastic used. Stiff probes can comprise several segments, which are joined by joints, so that core detachment is possible, even in the case of pipe bend-like finished parts. Such joints are not required by flexible plastic probes.

The pressure of the water is limited by the compressive strength of the probes and the finished part so that, as a function of the particular application, it must be adjustable.

The abrasive "dissolving" with water can be assisted by brushes, which move axially or rotate. The abrasive effect can be improved by preferably sharp-edged particles, which are suspended in the aqueous medium, e.g. by the actual fillers.

The temperature of the water can be between standard mains water temperatures and 120° C., optionally even higher It is necessary to work in pressure-tight autoclaves at above 95° C. The preferred water temperatures are 40° to 120° C.

A further speeding up of the dissolving process can be achieved with the aid of the following additives and methods:

A hydrophilic blowing agent operating in pressure and temperature-dependent manner can be incorporated into the polymers and is activated during core production or following enveloping for forming a foam structure. The porous structure increases the dissolving speed.

In the case of activation during core production, e.g. by injection moulding or compression injection moulding, a fine-pored, highly compressed foam is obtained, whose mechanical characteristics are similar to those of the unfoamed core.

In the case of activation during core production, e.g. by gas internal pressure processes (cavity injection), blow moulding and deep drawing, on the outside of the enveloping side is formed a compact, highly loadable layer and on the inside on the "dissolving" side a porous, rapidly dissolvable layer. This can be influenced by a corresponding time pressure control of the gas cushion.

It is also possible to use metal dust, metal powder and fine metal balls, in which an electron current is induced with the aid of a high frequency electromagnetic alternating field (normally produced with a coil), which leads to a temperature rise in the dissolving core. As the "solubility" is temperature-dependent, this leads to an increase in the dissolving rate. The metal is not melted.

Such a metal addition can be used for heating cores with and without blowing agents. It can also bring about a subsequent activation of the blowing agent, but the core cavity must not be foamed closed.

The aforementioned variants are described in conjunction with moulded articles, which serve as dissolving cores or soluble mould cores. However, these variants can also be used on other dissolvable moulded articles.

We claim:

1. A thermoplastic molded article which disintegrates or dissolves in an aqueous media prepared from a thermoplastic, moldable, extrudable, uniform, water-dispersable copolymer capable of being moldable into a product by a molding process, said copolymer having moieties consisting essentially of the following formulation:

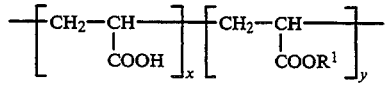

wherein R' is an alkyl group having 1 to 6 carbon atoms, y has a ratio to x from 0.2 to 0.8, and wherein the molecular weight is from about 10,000 to about 100,000 and has a ratio of MW to MN below about 4.

2. The thermoplastic molded article of claim 1, wherein the copolymer has a ratio of y to x is from 0.4 to 0.8.

3. The thermoplastic molded article of claim 1, wherein said molded article is formed of a composition comprising said copolymer and a filler, and wherein the copolymer is from 10 to 90 percent by weight of the composition and the filler is from 90 to 10 percent by weight of the composition.

4. The thermoplastic molded article of claim 3, wherein the filler is selected from the group consisting of talc, barium sulfate, calcium phosphate, mica, kaolin, sodium nitrate, sodium sulfate, powdered metals, and mixtures thereof.

5. The thermoplastic molded article of claim 3, wherein the copolymer and filler particles are firmly interconnected, whereby the physical properties of the copolymer formulation are uniform.

6. The thermoplastic molded article of claim 3, wherein the particle size of the filler is from about 0.1 micrometer to about 2 millimeters.

7. The thermoplastic molded article of claim 1, wherein the molding process is selected from the group consisting of injection molding, compression molding, pressed article molding, blow molding, deepdrawn molding, sheet extrusion, film extrusion, filament extrusion, rotational molding, compression-injection molding, cavity injection by gas, and sequences thereof.

8. The thermoplastic molded article of claim 1, wherein the molecular weight is from about 40,000 to 60,000.

9. The thermoplastic molded article of claim 1, wherein the ratio of MW to MN is from 3 to 4.

10. The thermoplastic molded article of claim 3, wherein the copolymer is from 60 to 40 percent by weight, and the filler is from 40 to 60 percent by weight.

11. The thermoplastic molded article of claim 1, wherein the copolymer is in the form of a powder, granular material, injection molded material, pressed article, compression molded material or sheet.

12. The thermoplastic molded article of claim 1, wherein the copolymer is mixed with at least one filler selected from the group consisting of water-soluble fillers, water insoluble fillers and mixtures thereof.

13. The thermoplastic molded article of claim 10, wherein the filler is water-insoluble and is from 10 to 40 percent by weight of the formulation.

14. The thermoplastic molded article of claim 1, wherein the copolymer disintegrates in aqueous media having an alkaline to neutral pH.

15. The thermoplastic molded article of claim 1, wherein the carboxyl group content is 30 to 50 percent by weight.

16. The thermoplastic molded article of claim 15, wherein the carboxyl group content is from 35 to 45 percent by weight.

* * * * *